United States Patent [19]

Doughty et al.

[11] Patent Number: 5,390,976
[45] Date of Patent: Feb. 21, 1995

[54] CONVERTIBLE FLOOR CONSOLE AND AUXILIARY SEAT FOR AN AUTOMOTIVE VEHICLE

[75] Inventors: John F. Doughty, Orchard Lake, Mich.; Christopher S. Clements, Rayleigh, England; Jospeh M. Naujokas, Livonia; Shabbir A. Kathiria, West Bloomfield, both of Mich.

[73] Assignee: Ford Motor Company, Dearborn, Mich.

[21] Appl. No.: 67,306

[22] Filed: May 26, 1993

[51] Int. Cl.⁶ ............................................. A47C 13/00
[52] U.S. Cl. ............................ 297/115; 297/234; 297/188.10
[58] Field of Search ............ 297/112, 113, 115, 188, 297/191, 194, 232, 248, 230.14, 411.32, 411.3, 411.35, 411.36, 118, 129, 192, 193, 234

[56] References Cited

U.S. PATENT DOCUMENTS

| | | |
|---|---|---|
| 1,356,558 | 10/1920 | Purcell . |
| 2,525,952 | 10/1950 | Saterlie et al. .................. 297/188 X |
| 2,958,369 | 11/1960 | Pitts et al. . |
| 3,083,998 | 4/1963 | Morris ................................ 297/194 |
| 3,336,077 | 8/1967 | Radke et al. . |
| 3,336,078 | 8/1967 | Haley . |
| 3,338,629 | 8/1967 | Drees . |
| 3,951,448 | 4/1976 | Hawie ............................... 297/191 X |
| 4,453,759 | 6/1984 | Kathiria ............................ 296/37.8 |
| 4,685,729 | 8/1987 | Heesch et al. ...................... 297/193 |
| 4,690,455 | 9/1987 | Bailey et al. ..................... 297/191 X |
| 4,934,750 | 6/1990 | Eichler et al. ................... 297/194 X |
| 5,131,716 | 7/1992 | Kwasnik et al. .................... 297/194 |
| 5,150,946 | 9/1992 | Marfilius et al. .................... 297/194 |
| 5,286,084 | 2/1994 | Bart ................................. 297/191 X |

FOREIGN PATENT DOCUMENTS

2615799  12/1988  France .................. 297/115

Primary Examiner—Kenneth J. Dorner
Assistant Examiner—Milton Nelson, Jr.
Attorney, Agent, or Firm—Mark Mollon; Roger L. May

[57] ABSTRACT

A console assembly for use in an automotive vehicle body passenger compartment is disclosed. The assembly includes a housing member interposed between a pair of seats in the vehicle, an armrest member and a bottom member pivotally secured to the housing member. The armrest member and bottom member pivot from a first position defining an auxiliary seat to a second position defining a console assembly in the vehicle.

19 Claims, 2 Drawing Sheets

CONVERTIBLE FLOOR CONSOLE AND AUXILIARY SEAT FOR AN AUTOMOTIVE VEHICLE

BACKGROUND OF THE INVENTION

1. Field of the Invention

The present invention relates generally to a console for use in automotive vehicle front seating arrangements. More particularly, the present invention relates to a console which is selectively convertible between a console assembly and an auxiliary passenger seat disposed between the driver and primary passenger seats of the vehicle.

2. Disclosure Information

It is well known in the automobile body arts to provide for the mounting of trays or other receptacles in the passenger compartment of an automobile to permit relatively stable support of items of food and drink and other small articles. Such trays are typically mounted to a floor console such as shown in U.S. Pat. No. 4,453,759, assigned to the assignee of the present invention. Although the console provides for the storage of articles, the console interrupts the continuity of the front seat resulting in the driver seat being spaced apart and remote from the primary passenger seat. To provide for a second or auxiliary passenger front seat, a continuous bench-type seat extending across the entire width of the vehicle or a split-type seat wherein the two passenger seat portions form one continuous portion of the split seat arrangement have been utilized. However, in both of these seating arrangements, it is not possible to provide for a functional console such as described above.

U.S. Pat. No. 4,685,729 proposes a console assembly which is convertible between a compartmentalized console extending from the front seat toward the vehicle dashboard and a second passenger seat position between the driver seat and the primary passenger seat. The console of the '729 patent utilizes a reversible motor driven lead screw attached to a track associated with the console frame which selectively extends and retracks the console frame relative to the seating frame to provide a console. In this manner, an auxiliary or second passenger seat is provided while still providing for a console assembly. However, the use of a motor driven console assembly often increases the cost of the console assembly, the weight of the assembly, and decreases the operating efficiency of the system. Therefore, it would be advantageous to provide a selectively convertible console assembly/auxiliary passenger seat combination which overcomes these deficiencies in the prior art.

SUMMARY OF THE INVENTION

Responsive to the deficiencies in the prior art, the present invention provides a console assembly for use in an automotive vehicle body passenger compartment having a floor for mounting a pair of seats in laterally spaced relationship about a vertical plane through the longitudinal axis of the vehicle body, each of the seats having a seat cushion and a seat back in generally orthogonal relationship. The console assembly comprises a housing member interposed between the pair of seats which includes a pair of upwardly projecting rear pillars at a rear end thereof, and a pair of upwardly projecting front pillars at a front end thereof, and which defines an internal storage cabinet thereby. The console assembly further includes an armrest member pivotally secured to the rear pillars and operative to pivot from a first generally vertical position contiguous with and complementary to the seat back to a second generally horizontal position over the housing member, as well as a bottom member pivotally secured to the front pillars. The bottom member pivots from a first generally horizontal position covering the housing member and which is contiguous with and complementary to the seat cushions to a second position longitudinally forward of the console assembly to expose the internal storage cavity of the housing member. When the armrest member and bottom members are in the first position, the console assembly defines an auxiliary passenger seat interposed between the driver seat and the primary passenger's seat. In one embodiment, when the bottom member is in the second position, an article receiving tray formed on a bottom surface thereof is exposed.

These and other objects, features and advantages of the present invention will be apparent from the drawings, detailed description, and claims which follow.

DETAILED DESCRIPTION OF THE PREFERRED EMBODIMENTS

Figure 1:
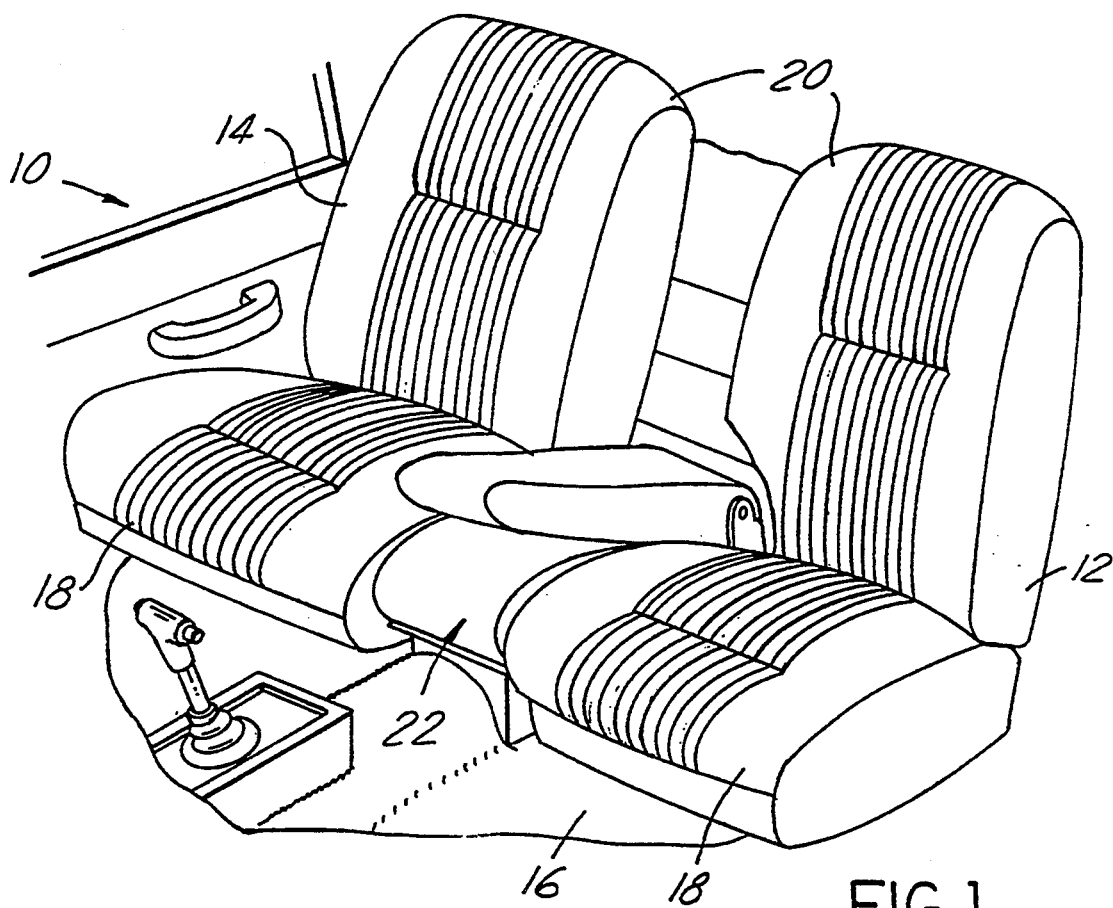
FIG. 1 is a perspective view of the console assembly of the present invention installed in a passenger compartment of an automobile.
Figure 2:
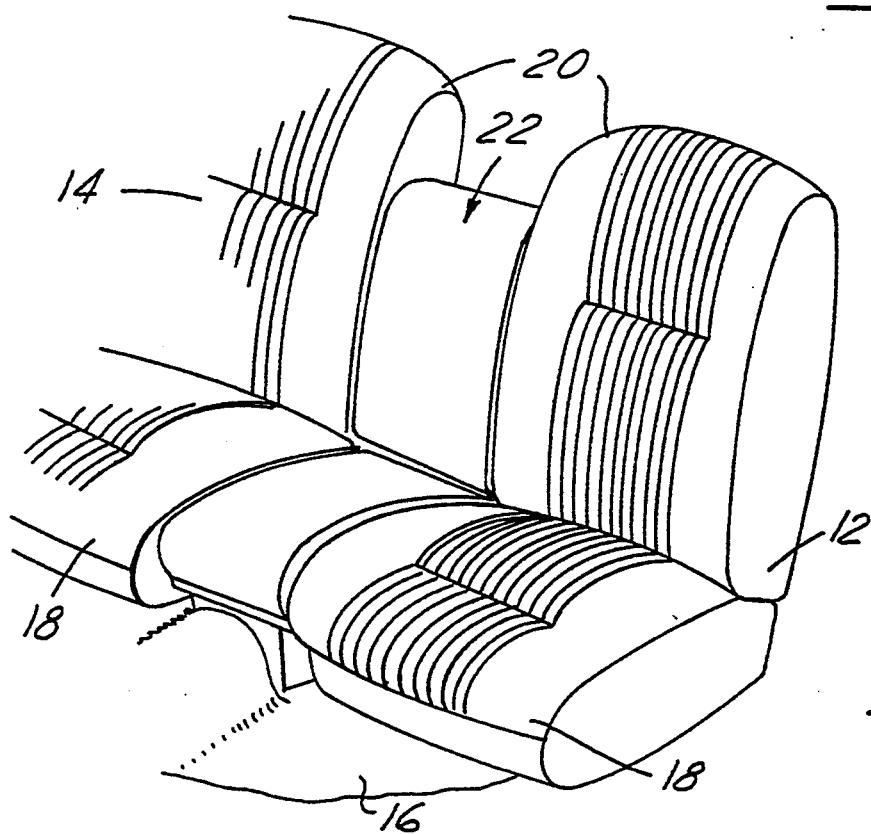
FIG. 2 is a perspective view of the console assembly of the present invention defining an auxiliary passenger seat.

Referring now to the drawings, FIGS. 1 and 2 show a passenger compartment 10 of an automotive vehicle having a driver seat 12 and a primary passenger seat 14 mounted to the vehicle floor 16 in laterally spaced relationship about a vertical plane passing through the longitudinal axis of the vehicle. The seats 12, 14 can be mounted directly to the floor but alternatively may be mounted to a seat frame mounted to floor 16. Each of the seats 12, 14, includes a seat cushion 18 and a seat back 20 in generally orthogonal relationship. A console assembly 22 according to the present invention is interposed between the driver seat 12 and the primary passenger seat 14. As shown in FIG. 1, the console assembly 22 functions as an arm rest between seats 12, 14 while in FIG. 2, the console assembly 22 functions as an auxiliary passenger seat between seats 12, 14.

Figure 4:
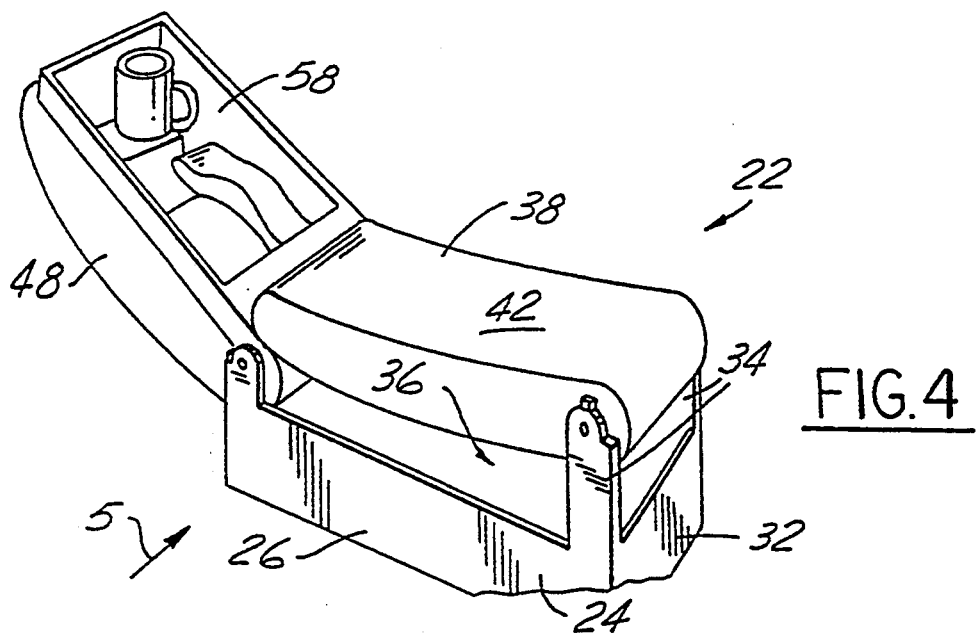
FIG. 4 is a perspective view of the console assembly of the present invention in an alternative position.
Figure 3:
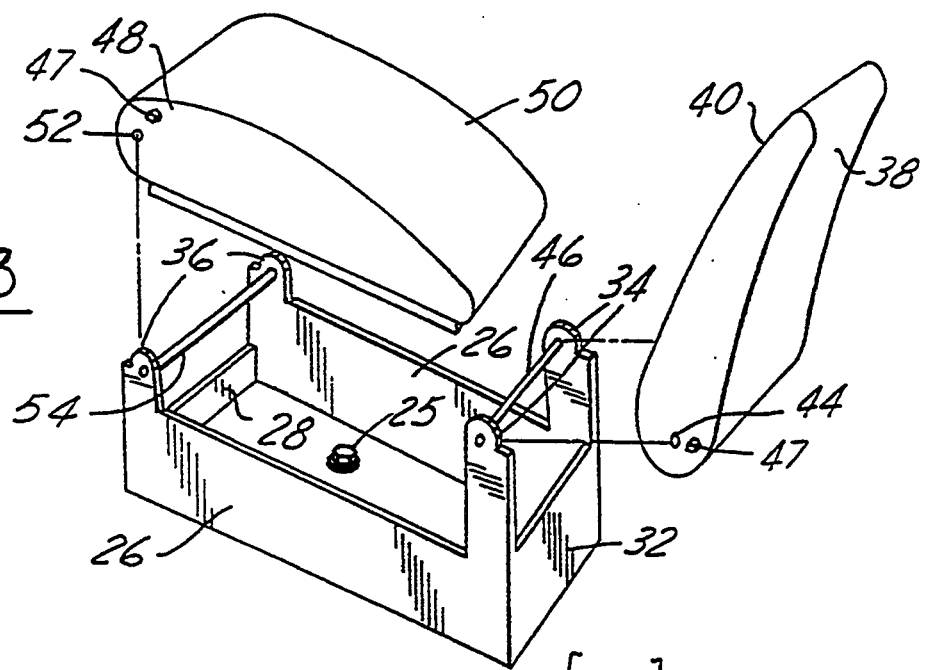
FIG. 3 is an exploded perspective view of the console assembly of the present invention with the armrest member in one position.

As shown in FIGS. 3 and 4, the console assembly 22 includes a generally rectangular housing member 24 secured to the floor 16 by any known mounting means, such as threaded rod fasteners 25. The housing member 24 is fabricated from a high strength, rigid material such as a metal alloy in a stamping or casting operation. The housing 24 includes a pair of sidewalls 26 disposed generally parallel to longitudinal axis of the vehicle. The housing 24 further includes a front transverse wall 28 having a pair of pillars 30 projecting upwardly therefrom and a rear transverse wall 32 having a pair of rear pillars 34 projecting upwardly therefrom. The front 28 and rear 32 transverse walls are disposed generally perpendicularly to the sidewalls 26 and defined in internal storage cavity 36 thereby. The internal storage cavity 36 is of sufficient size to accommodate articles such as maps, a small purse, and other such articles therein. Alternatively, the housing 24 could be mounted to a seat frame member securing seats 12, 14 to the vehicle floor. In this embodiment, the console assembly 22 can reciprocate axially with reciprocation of the seats 12, 14 in a direction parallel to the longitudinal axis of the vehicle.

The console assembly 22 further includes an armrest member 38 having a cushioned surface 40 and a rear surface 42. The armrest member 38 is pivotally secured to the rear pillars 34 by a hinge means so that the armrest member 38 can pivot from a first generally vertical position (FIG. 2) wherein the cushioned surface 40 is generally contiguous with and complementary to the seat backs 20 of the driver 12 and primary passenger seat 14 to a second generally horizontal position (FIG. 1) wherein the armrest member functions as an armrest between the vehicle seats. The hinge means can be any of a number of known types of pivot assemblies. As shown, the armrest member 38 includes an aperture 44 through which an elongated rod 46 is journaled. The rod 46 is rotatably secured to each of the rear pillars 34 to rotatably secure the armrest member 38 to the housing 24. The armrest member 38 also includes an abutment means such as a positive stop 47 which limits the rotation of the member in the vertical position. In an alternative embodiment, the rear surface 42 of the armrest member can include an article receiving tray having a plurality of storage areas for holding small articles, such as an ash tray or the like. Furthermore, the present invention contemplates that the armrest member comprises a two-piece assembly which opens along its horizontal axis to define more storage space.

The console assembly 22 of the present invention further includes a bottom member 48 pivotally secured to the front pillars 30 in a manner similar to that described above. The bottom member 48 is pivotally secured by an elongated rod 54 journaled through an aperture 52 and rotatably secured to each of the front pillars 30. The bottom member 48 includes a cushioned surface 50 and pivots from a first generally horizontal position (FIGS. 1-3) covering and disposed over the housing member 24. In the first position, the bottom member 48 is contiguous with and complementary to the cushions 18 of the driver 12 and primary passenger seat 14. In this manner, when the bottom member 48 and the armrest member 38 are in the first position, respectively, the console assembly of the present invention defines an auxiliary passenger seat interposed between the driver seat 12 and primary passenger seat 14 such as is shown in FIG. 2.

The bottom member 48 pivots from the first position to a second position longitudinally forward of the console assembly 22 (FIG. 4) to expose the internal storage cavity 36 thereby. In the second position, the bottom member 48 exposes an article receiving tray 58 formed on underside thereof. The article receiving tray 58 can be configured to receive any of a number of small articles, such as coins, cassette tapes, a mobile phone, cup holders, an ash tray and the like. A tray 58 may be molded integrally with the bottom member or may be formed separately as an insert secured thereto in a subsequent manufacturing operation. When the bottom member 48 is in the second position disposed longitudinally forward of the console assembly 22, the armrest member 38 can either be disposed in the first position thereby exposing the internal storage cavity of the housing 24 (FIG. 5) or pivoted to the second position to define an armrest between the driver seat 12 and primary passenger seat 14 (FIG. 4). As such, the present invention defines a combination console assembly and auxiliary passenger seat.

Figure 5:
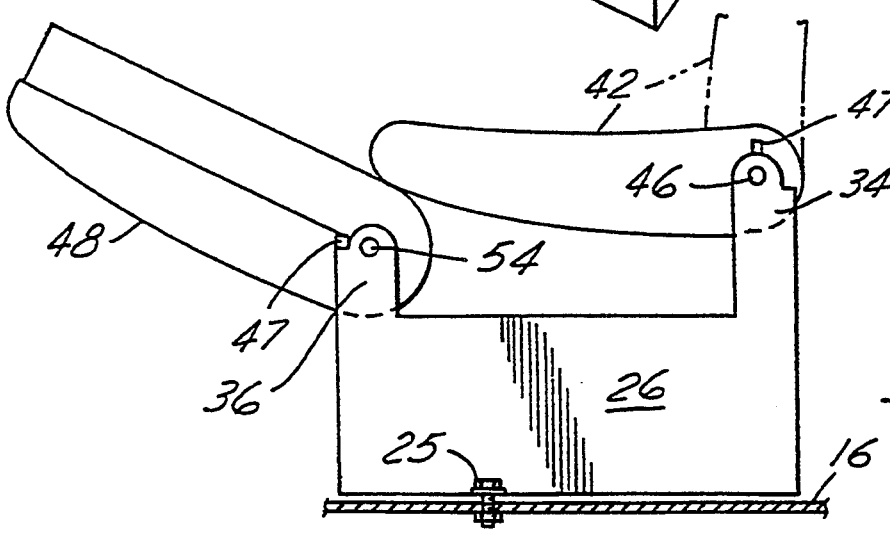
FIG. 5 is a side elevational view of the present invention taken in the direction of arrow 5 of FIG. 4.

As shown in FIG. 5, the armrest member 38 and bottom member 48 each includes abutment means 47 for limiting the amount of rotation of each member. The armrest member 38 rotates approximately ninety degrees to a vertical position while the bottom member 48 rotates approximately 140-160 degrees longitudinally forward from the housing 24. Various known types of positive stop mechanisms and detents are known which perform this function.

Various modifications to the present invention will no doubt occur to those skilled in the art. For example, the armrest member and bottom member may be fabricated in any of a number of known methods to conform to the driver and passenger seat assemblies. Furthermore, the console assembly may be secured directly to the vehicle floor or, alternatively, may be secured to a seat frame so that longitudinal movement of the driver and passenger seat results in longitudinal movement of the auxiliary seat formed by the present invention. It is the following claims, including all equivalents, which define the scope of the invention.

What is claimed is:

1. A console assembly for use in an automotive vehicle body passenger compartment having a floor for mounting a pair of seats in laterally spaced relationship about a vertical plane through the longitudinal axis of the vehicle body, each of said seats having a seat cushion and a seat back in generally orthogonal relationship, said console assembly comprising:

a housing member for interposition between said pair of seats and including a pair of upwardly projecting rear pillars at a rear end thereof and a pair of upwardly projecting front pillars at a front end thereof and defining an internal storage cavity therein;

an armrest member pivotably secured to said rear pillars and operative to pivot from a first generally vertical position contiguous with and complementary to the seat backs, when interposed between said pair of seats, to a second generally horizontal position over said housing member; and a bottom member pivotably secured to said front pillars and operative to pivot from a first generally horizontal position covering said housing member and being contiguous with and complementary to said seat cushions, when interposed between said pair of seats, to a second position longitudinally forward of said console assembly to expose said internal storage cavity of said housing member, whereby when said armrest member and said bottom member are in the first positions, said console assembly defines an auxiliary passenger seat interposed between said pair of seats.

2. A console assembly according to claim 1, further including mounting means for mounting said console assembly to the floor in an axially extending space defined between said seats, 3. A console assembly according to claim 1, wherein said housing member comprises a generally rectangular frame having a pair of side walls for disposal generally parallel to the longitudinal axis of said vehicle and a front and rear transverse wall disposed generally perpendicular to said side walls.

4. A console assembly according to claim 3, wherein said front and rear pillars are formed on said front and rear transverse walls, respectively.

5. A console assembly according to claim 1, wherein said armrest member includes a first surface and a second surface, said first surface having a cushioned exterior and being contiguous and complementary to said seat backs when said armrest member is interposed between said pair of seats and in said first generally vertical position.

6. A console assembly according to claim 1, wherein said armrest member further includes hinge means for engaging said rear pillars, said hinge means being operative to limit rotation of said armrest member in said first generally vertical position.

7. A console assembly according to claim 6, wherein said hinge means comprises an elongate rod, journaled through said armrest member and operative to rotatably engage said rear pillars.

8. A console assembly according to claim 1, wherein said bottom member further includes hinge means for engaging said front pillars, said hinge means being operative to limit rotation of said bottom member in said second longitudinally forward position.

9. A console assembly according to claim 8, wherein said hinge means comprises an elongate rod journaled through said bottom member and operative to rotatably engage said front pillars.

10. A console assembly according to claim 1, wherein said bottom member further includes a top surface and a bottom surface, said top surface having a cushioned exterior and being contiguous with and complementary to said seat cushions when interposed between said pair of seats and in said first generally horizontal position, said bottom surface including an article receiving tray formed therein.

11. A console assembly according to claim 1, wherein said housing member is fabricated from a metal alloy.

12. A console assembly according to claim 10, wherein said article receiving tray is fabricated from a synthetic polymeric material.

13. A console assembly for use in an automotive vehicle body passenger compartment having a floor for mounting a pair of seats in laterally spaced relationship about a vertical plane through the longitudinal axis of the vehicle body, each of said seats having a seat cushion and a seat back in generally orthogonal relationship, said console assembly comprising:

mounting means for mounting said console assembly to the floor in an axially extending space defined between said seats;

a housing member adapted to engage said mounting means to secure said housing member to said floor between said pair of seats, said housing including a generally rectangular frame having a pair of side walls for disposal generally parallel to the longitudinal axis of said vehicle and front and rear transverse wall for disposal generally perpendicular to said side walls, each of said front and rear transverse walls including, respectively, a pair of upwardly projecting front pillars and a pair of upwardly projecting rear pillars, said housing member defining an internal storage cavity therein;

an armrest member pivotably secured to said rear pillars of said rear transverse wall and operative, when interposed between said pair of seats, to pivot from a first generally vertical position contiguous with and complementary to the seat backs to a second generally horizontal position over said housing member; and a bottom member pivotably secured to said front pillars of said front transverse wall and operative, when interposed between said pair of seats, to pivot from a first generally horizontal position covering said housing member and being contiguous with and complementary to said seat cushions to a second position longitudinally forward of said console assembly to expose said internal storage cavity of said housing member, whereby when said armrest member and said bottom member are in the first positions, said console assembly defines an auxiliary passenger seat interposed between said pair of seats.

14. A console assembly according to claim 13, wherein said armrest member further includes hinge means for engaging said rear pillars, said hinge means being operative to limit rotation of said armrest member in said first generally vertical position.

15. A console assembly according to claim 14, wherein said hinge means comprises an elongate rod journaled through said armrest member and operative to rotatably engage each of said rear pillars.

16. A console assembly according to claim 13, wherein said bottom member further includes hinge means for engaging said front pillars, said hinge means being operative to limit rotation of said bottom member in said second longitudinally forward position.

17. A console assembly according to claim 16, wherein said hinge means comprises an elongate rod journaled through said bottom member and operative to rotatably engage each of said front pillars.

18. A console assembly according to claim 17, wherein said bottom member further includes a top surface and a bottom surface, said top surface having a cushioned exterior and being contiguous with and complementary to said seat cushions when interposed between said pair of seats in said first generally horizontal position, said bottom surface including an article receiving tray formed therein.

19. A combination console assembly and auxiliary passenger seat for use in a passenger compartment of an automotive vehicle having a floor for mounting a pair of seats in laterally spaced relationship about a vertical plane through the longitudinal axis of the vehicle body, each of said pair of seats having a seat cushion and seat back in generally orthogonal relationship, said combination comprising:

a housing member for securement to said floor between said pair of seats, said housing member including a generally rectangular frame having a pair of side walls for disposal generally parallel to the longitudinal axis of said vehicle and front and rear transverse wall disposed generally perpendicular to said side walls, each of said front and rear transverse walls including, respectively, a pair of upwardly projecting front pillars and a pair of upwardly projecting rear pillars, said housing member defining an internal storage cavity therein;

an armrest member pivotably secured to said rear pillars of said rear transverse wall and operative, when secured between said pair of seats, to pivot from a first generally vertical position contiguous with and complementary to the seat backs to a second generally horizontal position over said housing member, said armrest member including an elongate rod journaled therethrough for rotatably engaging each of said rear pillars; and a bottom member pivotably secured to said front pillars of said front transverse wall and operative, when secured between said pair of seats, to pivot from a first generally horizontal position covering said housing member and being contiguous with and complementary to said seat cushions to a second position longitudinally forward of said console assembly to expose said internal storage cavity of said housing member, said bottom member including an elongate rod journaled therethrough for rotatably engaging said front pillars and further including an article receiving tray formed on a bottom surface thereof so that in said second longitudinally forward position, said article receiving tray is exposed;

whereby when said armrest member and said bottom member are in the first positions, said console assembly defines an auxiliary passenger seat interposed between said pair of seats.

* * * * *